United States Patent
Liu et al.

(10) Patent No.: US 10,951,338 B2
(45) Date of Patent: Mar. 16, 2021

(54) SOFT VALUE EXTRACTION METHOD AND DEVICE APPLICABLE TO OVXDM SYSTEM, AND OVXDM SYSTEM

(71) Applicant: Shenzhen Super Data Link Technology Ltd., Guangdong (CN)

(72) Inventors: Ruopeng Liu, Guangdong (CN); Chunlin Ji, Guangdong (CN); Hao Zheng, Guangdong (CN); Shasha Zhang, Guangdong (CN)

(73) Assignee: SHEN ZHEN KUANG-CHI HEZHONG TECHNOLOGY LTD, Shenzhen (CN)

( * ) Notice: Subject to any disclaimer, the term of this patent is extended or adjusted under 35 U.S.C. 154(b) by 0 days.

(21) Appl. No.: 16/362,400

(22) Filed: Mar. 22, 2019

(65) Prior Publication Data
US 2019/0222335 A1   Jul. 18, 2019

Related U.S. Application Data

(63) Continuation of application No. PCT/CN2017/091963, filed on Jul. 6, 2017.

(30) Foreign Application Priority Data

Sep. 28, 2019 (CN) .......................... 201610865764.6

(51) Int. Cl.
  *H04J 3/06* (2006.01)
  *H04L 25/49* (2006.01)
  *H04L 1/00* (2006.01)

(52) U.S. Cl.
  CPC .................. *H04J 3/06* (2013.01); *H04L 1/00* (2013.01); *H04L 1/0054* (2013.01); *H04L 25/49* (2013.01)

(58) Field of Classification Search
  CPC .... H04J 3/06; H04J 15/00; H04L 1/00; H04L 25/49; H04L 1/0059; H04L 1/0048;
  (Continued)

(56) References Cited

U.S. PATENT DOCUMENTS 6,731,700 B1   5/2004  Yakhnich
2007/0263715 A1*  11/2007  Kim .................. H04L 25/03057
                                                                                          375/233
(Continued)

FOREIGN PATENT DOCUMENTS

CN   101404564 A   4/2009
CN   101431393 A   5/2009
(Continued)

OTHER PUBLICATIONS

English translation of International Search Report of PCT/CN2017/091963, dated Sep. 12, 2017., dated Sep. 12, 2017, 2 pages., dated Sep. 12, 2017, 2 pages.

(Continued)

*Primary Examiner* — Alex Skripnikov
*Assistant Examiner* — Sharmin Chowdhury
(74) *Attorney, Agent, or Firm* — Cantor Colburn LLP

(57) ABSTRACT

This application discloses a soft value extraction method and device applicable to an OvXDM system, and the OvXDM system. In the method, waveform coding is performed on all symbols in a hard value sequence, to generate a predictive value after overlapped coding; the symbols in the hard value sequence are reversed one by one, and overlapped coding is performed on each reversed symbol and associated symbols before and after the reversed symbol, to generate a predictive value of the reversed symbol; and for each symbol in the hard value sequence, a soft value of the current symbol is calculated based on $A \times (z^{+1} - z^{-1})$, where A is a coefficient related to a channel type, $z^{+1} = \|y_{rx} - y^{+1}\|$, and $z^{-1} =$
(Continued)

$\|y_{rx}-y^{-1}\|^2$; if $y^{+1}$ is a predictive value of the symbol obtained after overlapped coding and before reversing, $y^{-1}$ is a predictive value of the symbol obtained after overlapped coding and reversing; and $y_{rx}$ is a received signal sequence.

20 Claims, 6 Drawing Sheets

(58) Field of Classification Search
CPC ......... H04L 25/03286; H04L 25/03318; H04L 25/497; H04L 25/067; H04L 1/0045; H04L 1/0047

See application file for complete search history.

(56) References Cited

U.S. PATENT DOCUMENTS

| | | | |
|---|---|---|---|
| 2009/0092196 A1 | 4/2009 | Okunev | |
| 2010/0284427 A1* | 11/2010 | Liu | H04L 1/0041 370/479 |

FOREIGN PATENT DOCUMENTS

| | | |
|---|---|---|
| CN | 101557364 A | 10/2009 |
| CN | 101895373 A | 11/2010 |

OTHER PUBLICATIONS

Chun-ping Yang, "A Novel Product Concatenated Scheme for OvCDM", 2009 Mobile Congress.

Daoben Li, "A Novel High Spectral Efficiency Waveform Coding—OVFDM", China Communications, Feb. 2015.

European Search Report for corresponding application EP 17 85 4511; Report dated May 15, 2020.

Hao Wang, "Fast Detection Algorithm based on Sphere Decoding for Overlapped Hybrid Division Multiplexing System", 2010 2nd International Conference on Future Computer and Communication.

Jing Wang, "Single-Carrier Time-Domain Overlapping Multiplexing for Uplink Wireless Communications", Proceedings of IWSDA 07, p. 238-242.

Perijian Zhang, "A New Scheme of Space Division Multiplexing and Its Analysis", 2009 2nd International Conference on Power Electronics and Intelligent Transportation System.

Shuhei Hoshiba, "Basic BLER Study Faster-than-Nyquist for OFDM/OQAM in Multipath Fading Channel", Department of Information Communication Engineering, 2014.

Xilin Zhang, "An ISI Transmission and the Optimal Detection/Decoding of the Coded ISI System", Proceedings of IWSDA 2007, p. 283-287.

* cited by examiner $$a_0x_0 \quad a_1x_0 \quad a_2x_0 \quad \cdots \quad a_{k-1}x_0$$
$$a_0x_1 \quad a_1x_1 \quad a_2x_1 \quad \cdots \quad a_{k-1}x_1$$
$$a_0x_2 \quad a_1x_2 \quad a_2x_2 \quad \cdots \quad a_{k-1}x_2$$
$$\cdots$$
$$a_0x_{k-1} \quad a_1x_{k-1} \quad a_2x_{k-1} \quad \cdots \quad a_{k-1}x_{k-1}$$

SOFT VALUE EXTRACTION METHOD AND DEVICE APPLICABLE TO OVXDM SYSTEM, AND OVXDM SYSTEM

CROSS-REFERENCE TO RELATED APPLICATIONS

This application is a continuation application of PCT/CN2017/091963, filed Jul. 6, 2017, published as WO/2018/059057, which claims the priority of Chinese Application No. 201610865764.6, filed Sep. 28, 2016. The contents of the above-identified applications are incorporated herein by reference in their entireties.

TECHNICAL FIELD

This application relates to encoding and decoding field, and in particular, to a soft value extraction method and device applicable to an OvXDM system, and the OvXDM system.

BACKGROUND

In an OvXDM system, an entire process usually ends after a receiving end completes waveform decoding. In a relatively complex case, a skilled person uses the OvXDM system together with a common conventional communications technology, for example, a concatenated OvXDM system or a precoding OvXDM system, to improve overall system performance. However, an error correction code has a relatively good error correction capability, and can improve overall system performance and reduce a bit error rate. Therefore, most skilled persons apply the error correction code to the OvXDM system. In a commonly used error-correction decoding method, input information includes hard information and soft information. The hard information represents real information or data. For example, in the binary data of OvXDM system, hard information may be represented as $\{+1, -1\}$, and soft information represents possible value probability of each information. Practice has proved that the hard information has poorer error correction performance compared with the soft information, and has a specific loss in coding gain. Therefore, in order to improve a coding gain of an entire system, a soft information error correction code is used in most conditions.

However, in the OvXDM system, if information obtained after waveform decoding is hard information, for example, in a commonly used Viterbi decoding method, in order to apply a soft information error correction code to the OvXDM system, a problem to be firstly solved is to extract soft information corresponding to the hard information.

SUMMARY

To resolve the aforementioned problem, this application provides a soft value extraction method and device applicable to an OvXDM system, and the OvXDM system.

According to a first aspect of this application, this application provides a soft value extraction method applicable to an OvXDM system, including:

performing a waveform encoding operation on all symbols in a hard value sequence obtained by decoding, to generate a predictive value of the symbol obtained after overlapped coding;

reversing the symbols in the hard value sequence one by one, and performing an overlapped coding operation on each reversed symbol and associated symbols before and after the reversed symbol, to generate a predictive value of the reversed symbol; and for each symbol in the hard value sequence, calculating a soft value of the current symbol based on $A \times (z^{+1} - z^{-1})$, wherein A is a coefficient associated with a channel type, $z^{+1} = \|y_{rx} - y^{+1}\|^2$, and $z^{-1} = \|y_{rx} - y^{-1}\|^2$, wherein if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence.

According to a second aspect of this application, this application provides a soft value extraction device applicable to an OvXDM system, including:

a first predictive value calculation unit, configured to perform a waveform encoding operation on all symbols in a hard value sequence obtained by decoding, to generate a predictive value of the symbol obtained after overlapped coding;

a second predictive value calculation unit, configured to reverse the symbols in the hard value sequence one by one, and perform an overlapped coding operation on each reversed symbol and associated symbols before and after the symbol, to generate a predictive value of the reversed symbol; and a soft value calculation unit, configured to: for each symbol in the hard value sequence, calculate a soft value of the current symbol based on $A \times (z^{+1} - z^{-1})$, wherein A is a coefficient associated with a channel type, $z^{+1} = \|y_{rx} - y^{+1}\|^2$, and $z^{-1} = \|y_{rx} - y^{-1}\|^2$; wherein if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence.

According to a third aspect of this application, this application provides an OvXDM system, including the aforementioned soft value extraction device applicable to an OvXDM system, where the OvXDM system is an OvTDM system, an OvFDM system, an OvCDM system, an OvSDM system, or an OvHDM system.

Beneficial Effects of this Application are as Follows

According to the soft value extraction method and device applicable to an OvXDM system, and the OvXDM system; a hard value obtained after OvXDM waveform decoding is further processed, soft information of each symbol is extracted by using a logarithmic likelihood function, so as to implement soft value decoding and improve a coding gain of the system. In addition, design flexibility of the OvXDM system is improved, such that the OvXDM system can be used together with a commonly used soft information error correction code, to improve the coding gain of the entire system.

DESCRIPTION OF EMBODIMENTS

The following section further describes this application in detail with reference to specific embodiments and accompanying drawings.

In a modern channel coding method, a commonly used decoding method is soft in soft out (Soft In Soft Out, SISO), and an iteration method is used together, that is, iterative decoding, also referred to as Turbo decoding sometimes. Compared with a conventional algebraic decoding method in channel coding, the soft in soft out decoding method can additionally improve a coding gain. A precondition of the soft in soft out decoding method is soft information input of a decoder. In an OvXDM system, if information obtained after waveform decoding is hard information, for example, in a commonly used Viterbi decoding method, to use the soft in soft out decoding method, a soft value needs to be firstly extracted from the OvXDM system.

In this application, the OvXDM system is an overlapped time division multiplexing (OvTDM) system, an overlapped frequency division multiplexing (OvFDM) system, an overlapped code division multiplexing (OvCDM) system, an overlapped space division multiplexing (OvSDM) system, or an overlapped hybrid division multiplexing (OvHDM) system.

Using the OvTDM system as an example, a transmitting end and a receiving end of the OvTDM system are briefly described.

Figures 1, 2:
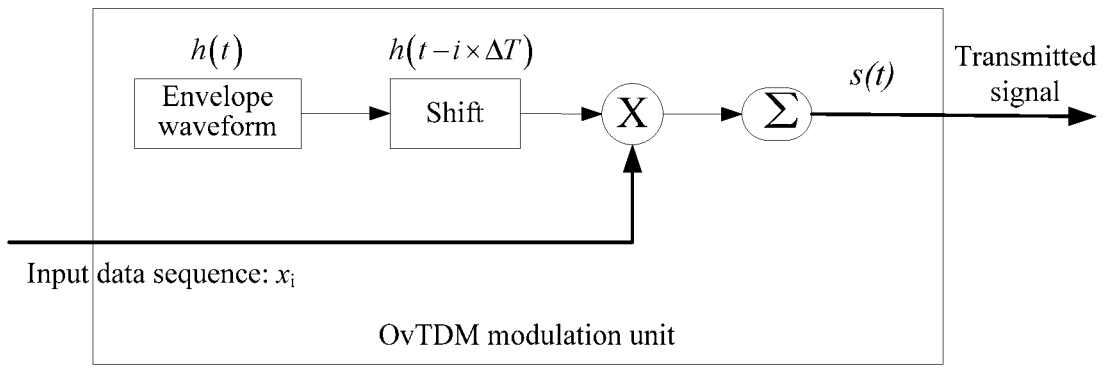
FIG. 1 is a schematic structural diagram of a transmitting end in a conventional OvTDM system.
FIG. 2 is a schematic diagram of a parallelogram rule for performing overlapped multiplexing and coding on input symbols in an OvTDM system.

FIG. 1 shows a transmitting process of the transmitting end in the OvTDM system. Specific steps are described as the following section.

(1) Firstly, generating an envelope waveform h(t) of a transmitting signal.

(2) Shifting the envelope waveform h(t) generated in the step (1) by a specific time interval, to generate envelope waveforms h(t−i×ΔT) of a to-be-transmitted signal at various moments.

(3) Multiplying a to-be-transmitted symbol $x_i$ by the envelope waveforms h(t−i×ΔT) of corresponding moments that are generated in the step (2), to generate to-be-transmitted signal waveforms $x_i$h(t−i×ΔT) at various moments.

(4) Superimposing the to-be-transmitted signal waveforms $x_i$h(t−i×ΔT) generated in the step (3), to generate a waveform of the transmitting signal. The transmitting signal may be represented as $$s(t) = \sum_i x_i h(t - i \times \Delta T).$$

An overlapped multiplexing method follows a parallelogram rule shown in FIG. 2.

The transmitting end transmits an encoded and modulated signal by using an antenna. The signal is transmitted in a wireless channel. The receiving end performs matched filtering on the received signal, then performs sampling and decoding on the signal, and finally performs a judgment operation on the signal and outputs a bit stream.

Figure 3:
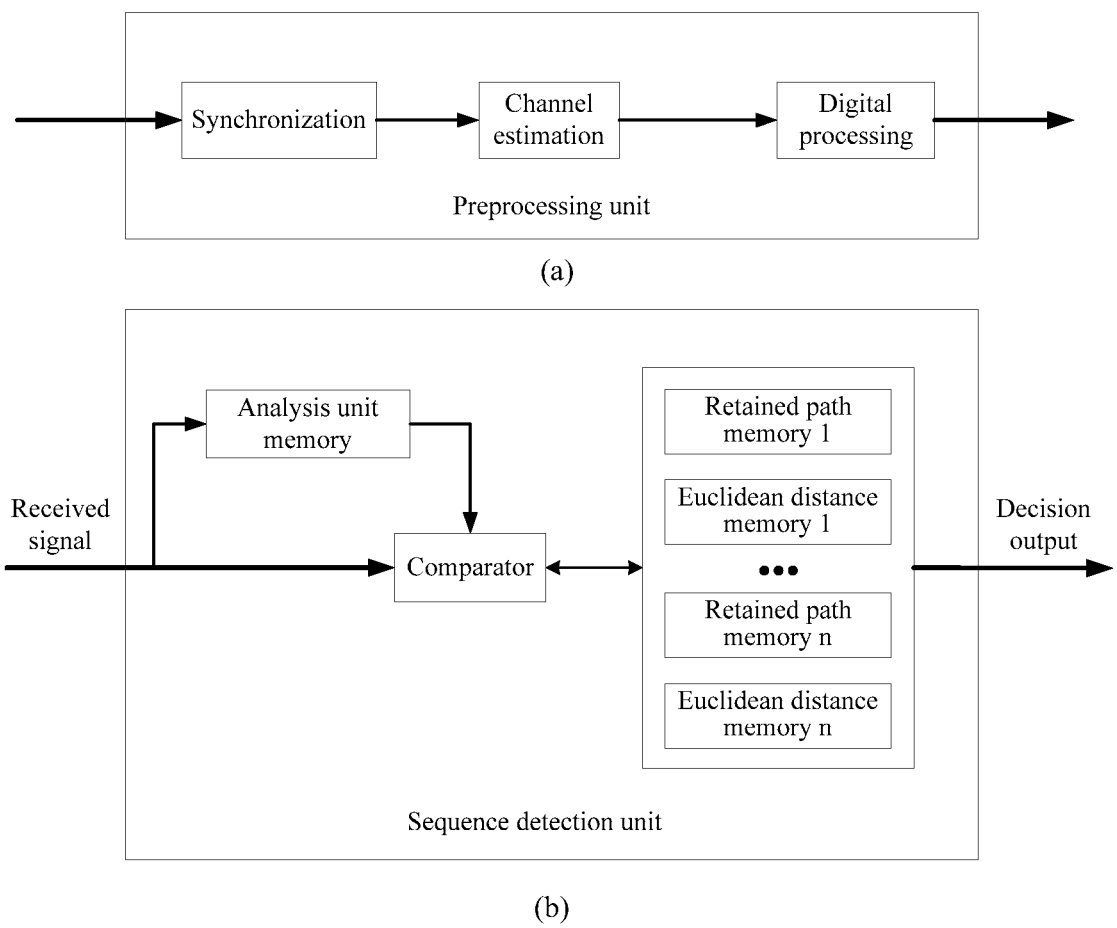
FIGS. 3 (*a*) and (*b*) are respectively a preprocessing unit and a sequence detection unit of a receiving end in a conventional OvTDM system.

FIG. 3 illustrates a receiving process of the receiving end in the OvTDM system. FIG. 3 (*a*) shows a preprocessing unit of the receiving end in the OvTDM system, and FIG. 3 (*b*) shows a sequence detection unit of the receiving end in the OvTDM system. Specific steps are described as the following section.

(5) Firstly, synchronizing the received signal, wherein the synchronization operation includes carrier synchronization, frame synchronization, symbol synchronization, time synchronization, and the like.

(6) Performing digital processing on the received signal in each frame based on a sampling theorem.

(7) Cutting the received waveform based on a waveform transmission time interval.

(8) Decoding the waveform obtained after cutting based on a decoding algorithm. For example, performing the decoding operation through Viterbi decoding.

Figure 4:
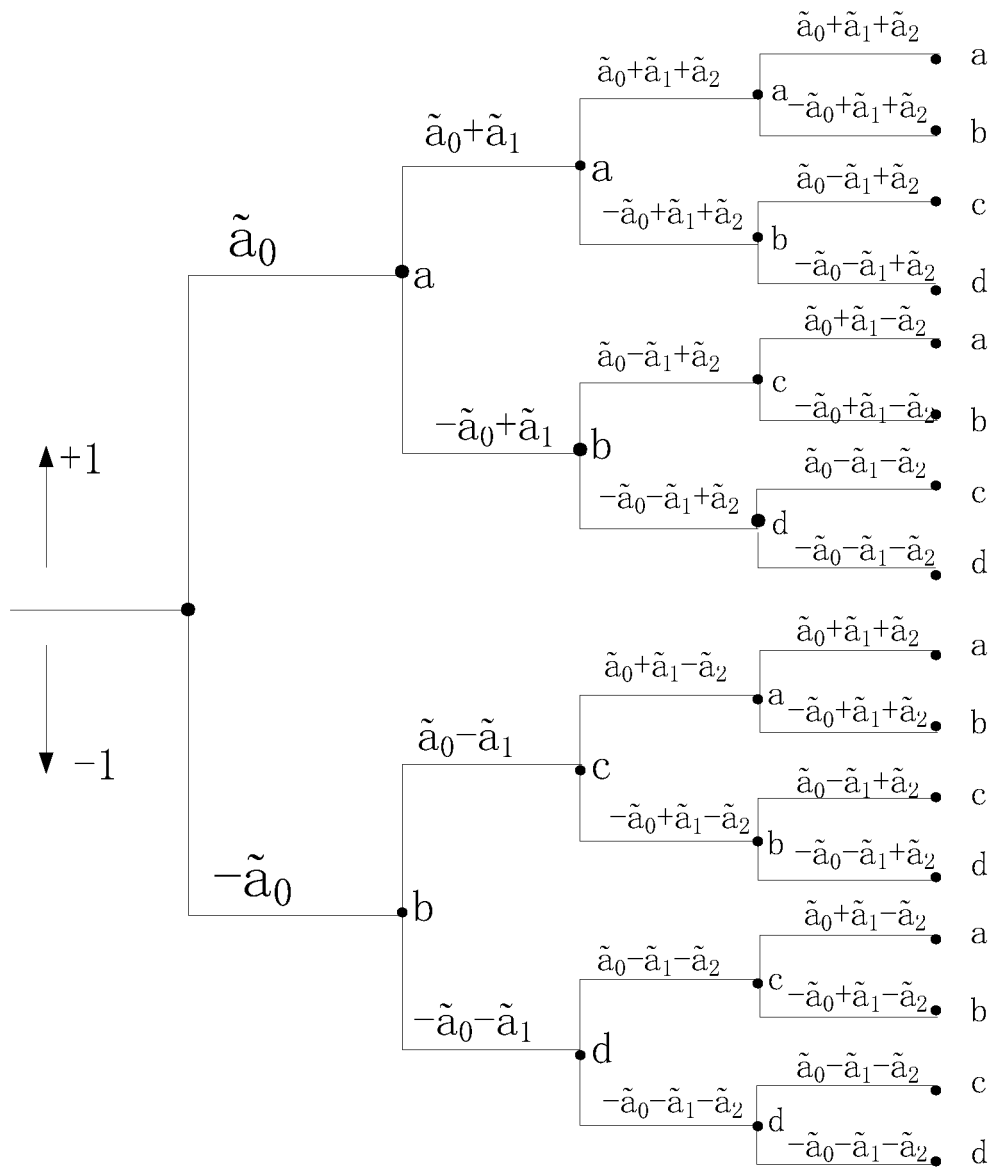
FIG. 4 is an input-output code tree diagram of a system when a total number K of times of overlapped multiplexing of the system is 3.
Figure 5:
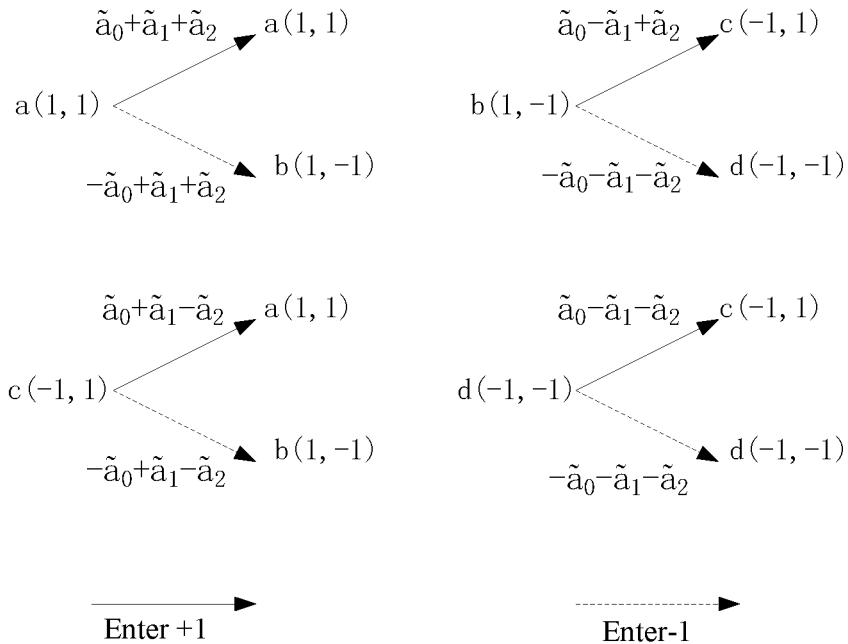
FIG. 5 is a node state transition diagram of a system corresponding to FIG. 4.
Figure 6:
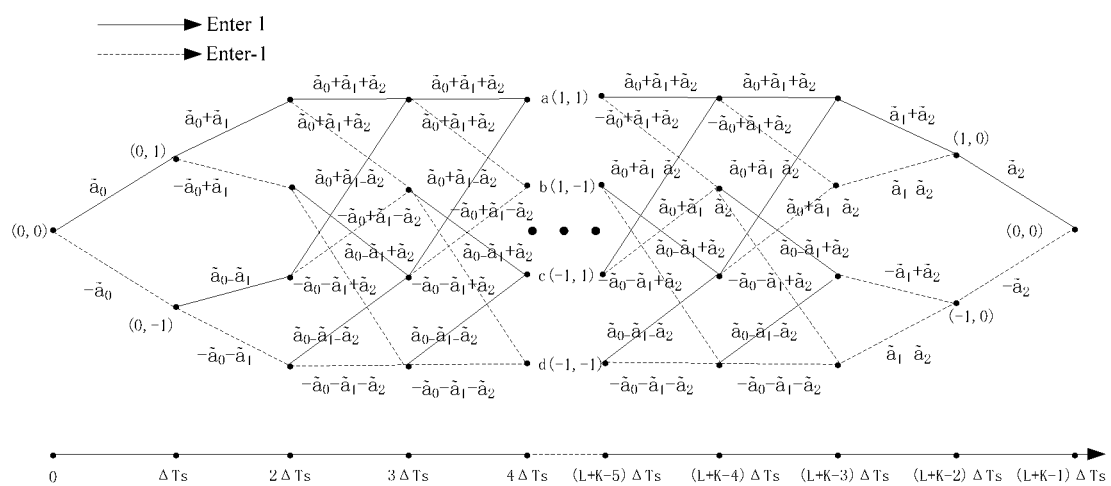
FIG. 6 is Trellis diagram of a system corresponding to FIG. 4 or FIG. 5.

For the decoding process, referring to FIG. 4 to FIG. 6. FIG. 4 is an input-output code tree diagram of the system when a total number K of times of overlapped multiplexing is 3. FIG. 5 is a corresponding node state transition diagram of the system. FIG. 6 is a Trellis diagram of the system.

An output result obtained after waveform decoding and demodulating is hard information. Therefore, in order to use the soft in soft out (SISO) decoding method, the soft information, namely, a soft value, corresponding to the hard information needs to be firstly extracted from the system.

In this application, a hard value obtained after conventional OvXDM waveform decoding is further processed, and the soft information corresponding to each symbol is extracted by using a logarithmic likelihood function. A specific principle is described as the following section.

Figure 7:
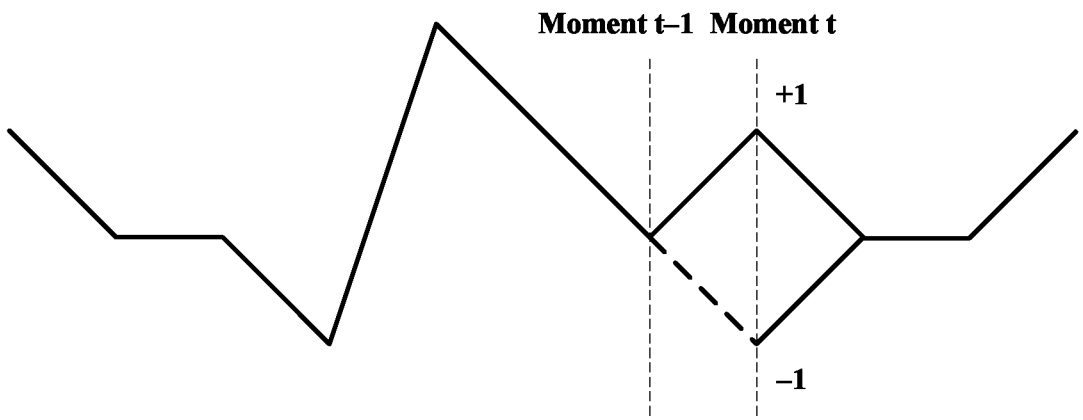
FIG. 7 is a schematic diagram of path selection from a moment t−1 to a moment t in a path in a soft value extraction method applicable to an OvXDM system according to an embodiment of this application.

After waveform decoding, all hard values have been outputted; that is, maximum likelihood results of all moments have been found in the trellis diagram. From a moment t−1 to a moment t in a path, in order to output the optimal path, there are two choices: an input value is +1, or an input value is −1, as shown in FIG. 7.

It is assumed that $z^{+1}$ and $z^{-1}$ represent total tests of two sections of paths on which opposite symbol values are taken at the moment t, r represents a total received signal sequence at the moment t, and $y^{+1}$ and $y^{-1}$ represent corresponding predictive values obtained after overlapped multiplexing is performed on a waveform decoding result, where $y^{+1}$ and $y^{-1}$ are respectively corresponding to a situation in which a value is +1 at the moment t and a situation in which a value is −1 at the moment t. In this case, the corresponding tests may be represented as follows:

$$z^{+1} = \|r - y^{+1}\|^2;$$

$$z^{-1} = \|r - y^{-1}\|^2.$$

It is assumed that $y_{rx}$ represents a sequence obtained after overlapped multiplexing that is sent by the transmitting end of the system, if the channel is an additive white Gaussian noise (AWGN) channel, channel transition probabilities corresponding to the two values that are obtained at the moment t may be represented as follows:

$$p(r \mid y_{tx} = y^{+1}) = \frac{1}{\sqrt{2\pi}\,\sigma} e^{-\frac{z^{+1}}{2\sigma^2}};$$

$$p(r \mid y_{tx} = y^{-1}) = \frac{1}{\sqrt{2\pi}\,\sigma} e^{-\frac{z^{-1}}{2\sigma^2}}.$$

Based on a determining result obtained through Viterbi decoding before the moment t−1, it can be learned that there are only two path transition possibilities from the moment t−1 to the moment t. It is assumed that $s_t$ is an output symbol at the moment t, symbol probabilities corresponding to transition from the moment t−1 to the moment t may be represented as follows:

$$p(s_t = +1) = \frac{p(r \mid y_{tx} = y^{+1})}{p(r \mid y_{tx} = y^{+1}) + p(r \mid y_{tx} = y^{-1})};$$

$$p(s_t = -1) = \frac{p(r \mid y_{tx} = y^{-1})}{p(r \mid y_{tx} = y^{+1}) + p(r \mid y_{tx} = y^{-1})}.$$

The following formula may be obtained by calculating a logarithmic likelihood ratio of the above two formulas:

$$LLR = \log\frac{p(s_t = +1)}{p(s_t = -1)} = \log\frac{p(r \mid y_{tx} = y^{+1})}{p(r \mid y_{tx} = y^{-1})} = -\frac{1}{2\sigma^2}(z^{+1} - z^{-1});$$

where $\sigma^2$ is a noise variance, and the obtained LLR is a soft value corresponding to a hard value at a current moment.

In the aforementioned process, if a channel attenuation coefficient is further considered, calculation of the measures $z^{+1}$ and $z^{-1}$ are adjusted as follows:

$$z^{+1} = \|r - \alpha y^{+1}\|^2$$

$$z^{-1} = \|r - \alpha y^{-1}\|^2$$

where $\alpha$ is the channel attenuation coefficient.

The aforementioned section describes a concept and a principle of extracting soft information corresponding to hard information in this application. The following section describes this application in detail.

Figure 8:
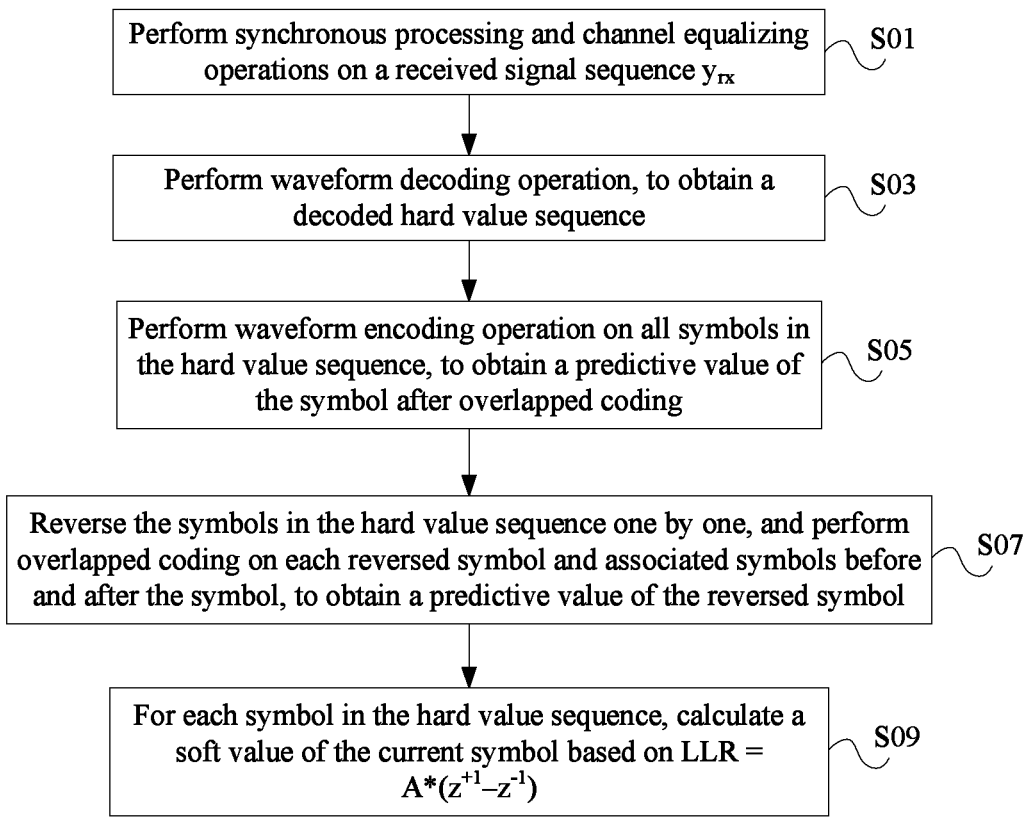
FIG. 8 is a schematic flowchart of a soft value extraction method applicable to an OvXDM system according to an embodiment of this application.

It is assumed that a total number of times of overlapping in OvXDM is K, and a data frame length is N. A signal sent by the transmitting end through OvXDM waveform coding is $y_{tx}$, the signal transmitted through a real channel and received by the receiving end is $y_{rx}$. Referring to FIG. 8, this application provides a soft value extraction method applicable to an OvXDM system, and including steps S05 to S09. In one embodiment, the method may further include steps S01 and S03. In one embodiment, the OvXDM system is an OvTDM system, an OvFDM system, an OvCDM system, an OvSDM system, or an OvHDM system.

Step S01: Performing synchronous processing and channel equalizing operations on a received signal sequence $y_{rx}$.

Step S03: Performing, according to a predetermined decoding method, a waveform decoding operation on the received signal sequence obtained after synchronous processing and channel equalizing, to generate a decoded hard value sequence. Hard values in the hard value sequence may be represented as $\hat{x}_i \in \{+1, -1\}$, where i represents a symbol index ranging from 1 to N, and N is a data frame length. In one embodiment, the predetermined decoding method in step S03 may be an existing decoding method, such as a Viterbi decoding method, or may be a decoding method appeared in the future.

Figure 9:
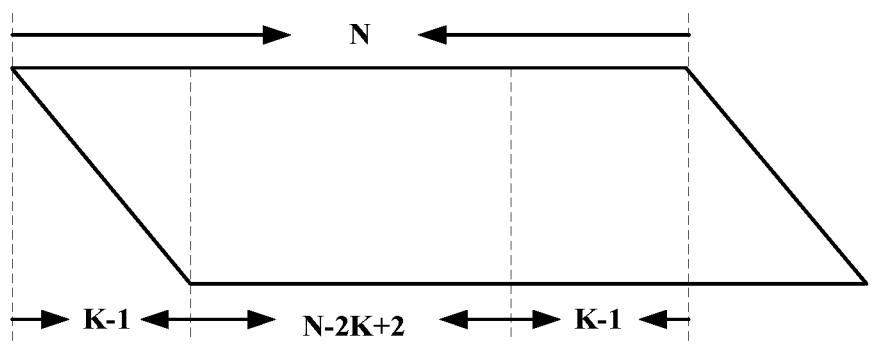
FIG. 9 is a schematic parallelogram diagram of waveform coding in a soft value extraction method applicable to an OvXDM system according to an embodiment of this application.

Step S05: Performing waveform encoding operation on all symbols in the hard value sequence obtained through decoding, to generate a predictive value of the symbol obtained after overlapped coding. It should be noted that, due to correlation between symbols in the OvXDM system, convolutional coding performed on a current symbol $\hat{x}_i$ only affects the $(i-K+1)^{th}$ bit to the $(i+K+1)^{th}$ bit of the symbol. Therefore, when waveform convolutional operation is performed again in step S05 after reversing the symbols one by one, overlapped coding needs to be performed only on an associated symbol rather than on all N symbols. Using the OvTDM system as an example, a waveform convolutional coding process is presented in a parallelogram shape. Waveform convolutional operation performed on the first and the last K−1 symbols in N symbols affect only some symbols after or before the K−1 symbols. A process of calculating a predictive value of the symbol obtained after overlapped coding and reversing may be divided into three parts for independent processing: the first to $(K-1)^{th}$ bits, the $K^{th}$ to $(N-K+1)^{th}$ bits, and the last $(N-K+2)^{th}$ to $N^{th}$ bits, as shown in FIG. 9.

Step S07: Reversing the symbols in the hard value sequence one by one, and then performing overlapped coding on each reversed symbol and associated symbols before and after the symbol, to generate a predictive value of the reversed symbol. When the total number K of times of overlapping in the OvXDM system is relatively large or the frame length N is relatively large, complexity of performing overlapped multiplexing and coding for each bit in the reversed symbol is relatively high. A relatively long delay is generated during engineering implementation. In addition, there is a measure subtraction operation after reversing the bit in a last LLR calculation process. Therefore, metrics values only of related bits overlapping with a reversed bit in coding may be calculated, and a difference between sequences is found through comparison. In other words, a measure difference is also calculated only based on this part of metrics values.

Step S09: For each symbol in the hard value sequence, calculating a soft value of the current symbol based on $LLR = A \times (z^{+1} - z^{-1})$, where A is a coefficient associated with a channel type in step S01, $z^{+1} = \|y_{rx} - y^{+1}\|^2$, and $z^{-1} = \|y_{rx} - y^{-1}\|^2$, where if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence. In one embodiment, when the channel type in step S01 is an additive white Gaussian noise channel, A is $$-\frac{1}{2}\sigma^2$$

if a symbol obtained after waveform decoding is +1; or A is $$\frac{1}{2}\sigma^2$$

if a symbol obtained after waveform decoding is −1, where $\sigma^2$ is a mean square deviation of the channel. The mean square deviation $\sigma^2$ of the channel may be obtained through channel estimating. In one embodiment, if a channel attenuation coefficient is considered, calculation of $z^{+1}$ and $z^{-1}$ may be adjusted as $z^{+1}=\|y_{rx}-\alpha y^{+1}\|^2$ and $z^{-1}=\|y_{rx}-\alpha y^{-1}\|^2$, where α is the channel attenuation coefficient, and may be obtained through channel estimating. In one embodiment, soft information obtained through calculating may be further adjusted depending on a specific situation, that is, the soft value is multiplied by an adjustment factor φ. In other words, after adjustment, the soft value of the current symbol changes to $\phi \times A \times (z^{+1}-z^{-1})$. A value of the adjustment factor φ ranges from 0 to 1. When the total number K of times of overlapping in the OvXDM system increases, the value of φ decreases, that is, φ is closer to 0. Soft values corresponding to symbols in a data frame are obtained in step S09. These soft values may be used as input information of soft in soft out error correction code in the next stage.

In the soft value extraction method applicable to an OvXDM system in this application, hard value decoding is performed in steps S01 and S03; and soft information (soft values) corresponding to hard values are extracted from the hard values in steps S05, S07, and S09, where the extracted soft values may be applied to soft in soft out error correction code in the next stage.

The soft value extraction method in this application solves the following problem: If hard values of the symbols are obtained by waveform decoding in the conventional OvXDM system, when the OvXDM system is used together with an error correction code, error correction decoding of the hard value has a specific loss in coding gain compared with error correction decoding of the soft value; and system performance is reduced when the receiving end uses the hard values as input information of an error correction code. In the soft value extraction method in this application, a hard value obtained after OvXDM waveform decoding is further processed, soft information of each symbol is extracted by using a logarithmic likelihood function, so as to further implement soft value decoding and improve a coding gain of the system. In addition, design flexibility of the OvXDM system is improved, such that the OvXDM system can be used together with a commonly used soft information error correction code, to improve the coding gain of the entire system.

Figure 10:
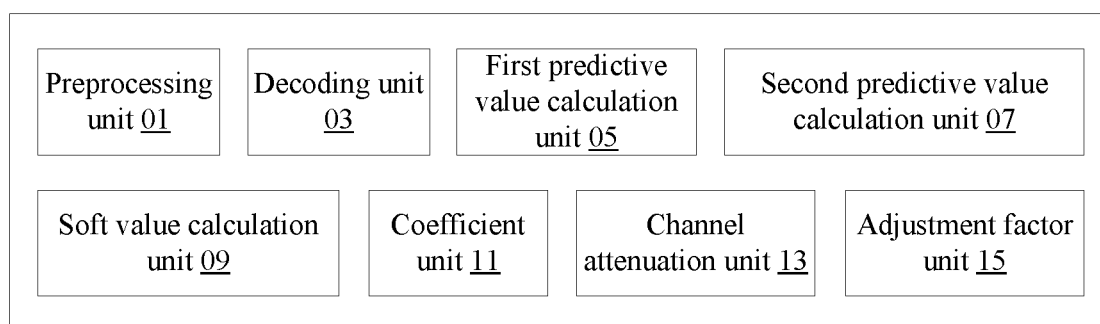
FIG. 10 is a schematic structural diagram of a soft value extraction device applicable to an OvXDM system according to an embodiment of this application.

Correspondingly, this application further provides an OvXDM system, including a soft value extraction device applicable to an OvXDM system, where the OvXDM system is an OvTDM system, an OvFDM system, an OvCDM system, an OvSDM system, or an OvHDM system. Referring to FIG. 10, the soft value extraction device applicable to an OvXDM system includes a first predictive value calculation unit 05, a second predictive value calculation unit 07, and a soft value calculation unit 09. In a preferred embodiment, the soft value extraction device further includes at least one of a coefficient unit 11, a channel attenuation unit 13, and an adjustment factor unit 15. In one embodiment, the soft value extraction device may further include a preprocessing unit 01 and a decoding unit 03.

The preprocessing unit 01 is configured to perform synchronous processing and channel equalizing operations on a received signal sequence $y_{rx}$.

The decoding unit 03 is configured to perform, according to a predetermined decoding method, a waveform decoding operation on the received signal sequence obtained after synchronous processing and channel equalizing, to generate a decoded hard value sequence. Hard values in the hard value sequence may be represented as, $\hat{x}_i \in \{+1,-1\}$, where i represents a symbol index ranging from 1 to N, and N is a data frame length. In one embodiment, the predetermined decoding method in the decoding unit 03 may be an existing decoding method, such as a Viterbi decoding method, or may be a decoding method appeared in the future.

The first predictive value calculation unit 05 is configured to perform waveform encoding operation on all symbols in the hard value sequence, to generate a predictive value of the symbol obtained after overlapped coding. It should be noted that, due to a correlation between symbols in the OvXDM system, convolutional coding performed on a current symbol $\hat{x}_i$ only affects the $(i-K+1)^{th}$ bit to the $(i+K+1)^{th}$ bit of the symbol. Therefore, when waveform convolutional operation is performed by the first predictive value calculation unit 05 again after reversing the symbols one by one, overlapped coding needs to be performed only on an associated symbol rather than on all N symbols. Using the OvTDM system as an example, a waveform convolutional coding process is presented in a parallelogram shape. Waveform convolutional operation performed on the first and the last K−1 symbols in N symbols affect only some symbols after or before the K−1 symbols. A process of calculating a predictive value of the symbol obtained after overlapped coding and reversing may be divided into three parts for independent processing: the first to $(K-1)^{th}$ bits, the $K^{th}$ to $(N-K+)^{th}$ bits, and the last $(N-K+2)^{th}$ to $N^{th}$ bits, as shown in FIG. 9.

The second predictive value calculation unit 07 is configured to reverse the symbols in the hard value sequence one by one, and perform overlapped coding on each reversed symbol and associated symbols before and after the symbol, to generate a predictive value of the reversed symbol. When the total number K of times of overlapping in the OvXDM system is relatively large or the frame length N is relatively large, complexity of performing overlapped multiplexing and coding for each bit in the reversed symbol is relatively high. A relatively long delay is generated during engineering implementation. In addition, there is a measure subtraction operation after reversing the bit in a last LLR calculation process. Therefore, metrics values only of related bits overlapping with a reversed bit in coding may be calculated, and a difference between sequences is found through comparison. In other words, a measure difference is also calculated only based on this part of metrics values.

The soft value calculation unit 09 is configured to: for each symbol in the hard value sequence, calculate a soft value of the current symbol based on $A \times (z^{+1}-z^{-1})$, where A is a coefficient associated with a channel type, $z^{+1}=\|y_{rx}-y^{+1}\|^2$, and $A \times (z^{+1}-z^{-1})$, where if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence. The soft value calculation unit 09 obtains soft values corresponding to symbols in a data frame. These soft values may be used as input information of soft in soft out error correction code in the next stage.

The coefficient unit 11 is configured to assign a value to the coefficient A in the soft value calculation unit 09, where when the channel type is an additive white Gaussian noise channel, $$-\frac{1}{2}\sigma^2$$

is assigned to A if a symbol obtained after waveform decoding is +1; or $$\frac{1}{2}\sigma^2$$

is assigned to A if a symbol obtained after waveform decoding is −1, where $\sigma^2$ is a mean square deviation of the channel, and the mean square deviation $\sigma^2$ of the channel may be obtained through channel estimating.

The channel attenuation unit 13 is configured to further introduce a channel attenuation coefficient α when the soft value calculation unit 09 calculates the soft value of the current symbol, such that $z^{+1}=\|y_{rx}-\alpha y^{+1}\|^2$ and $z^{-1}=\|y_{rx}-\alpha y^{-1}\|^2$, where the channel attenuation coefficient α may be obtained through channel estimating.

The adjustment factor unit 15 is configured to further introduce an adjustment factor φ when the soft value calculation unit 09 calculates the soft value of the current symbol, such that the soft value of the current symbol is $\varphi \times A \times (z^{+1}-z^{-1})$, where a value of the adjustment factor φ ranges from 0 to 1, and the value of φ decreases as a total number of times of overlapping in the OvXDM system increases.

The aforementioned content is a further detailed description of this application with reference to specific embodiments, and it should not be considered that specific implementation of this application is limited only to the description. A person of ordinary skill in the technical field to which this application belongs may further make simple derivations or replacements without departing from the inventive concept of this application.

What is claimed is:

1. A soft value extraction method applicable to an overlapped X domain multiplexing OvXDM system, comprising:
    performing a waveform encoding operation on all symbols in a hard value sequence obtained by decoding, to generate a predictive value of the symbol obtained after overlapped coding;
    reversing the symbols in the hard value sequence one by one, and performing an overlapped coding operation on each reversed symbol and associated symbols before and after the reversed symbol, to generate a predictive value of the reversed symbol; and
    for each symbol in the hard value sequence, calculating a soft value of the current symbol based on $A \times (z^{+1}-z^{-1})$, wherein A is a coefficient associated with a channel type, $z^{+1}=\|y_{rx}-y^{+1}\|^2$, and $z^{-1}=\|y_{rx}-y^{-1}\|^2$, wherein
    if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence.

2. The soft value extraction method applicable to the OvXDM system according to claim 1, wherein when a channel is an additive white Gaussian noise channel, A is $$-\frac{1}{2\sigma^2}$$

if the symbol obtained after waveform decoding is +1; or A is $$\frac{1}{2\sigma^2}$$

if the symbol obtained after waveform decoding is −1, wherein $\sigma^2$ is a mean square deviation of the channel.

3. The soft value extraction method applicable to the OvXDM system according to claim 2, wherein $A \times (z^{+1}-z^{-1})$ is multiplied by an adjustment factor φ to generate a new value, the soft value of the current symbol is calculated based on the new value; wherein the adjustment factor φ ranges from 0 to 1, and φ decreases as a total number of times of overlapping in the OvXDM system increases.

4. The soft value extraction method applicable to the OvXDM system according to claim 1, wherein a channel attenuation operation is performed when the soft value of the current symbol is calculated based on $A \times (z^{+1}-z^{-1})$ wherein a channel attenuation coefficient is α; such that $z^{+1}=\|y_{rx}-\alpha y^{+1}\|^2$, and $z^{-1}=\|y_{rx}-\alpha y^{-1}\|^2$.

5. The soft value extraction method applicable to the OvXDM system according to claim 1, wherein the OvXDM system is an overlapped time division multiplexing (OvTDM) system, an overlapped frequency division multiplexing (OvFDM) system, an overlapped code division multiplexing (OvCDM) system, an overlapped space division multiplexing (OvSDM) system, or an overlapped hybrid division multiplexing (OvHDM) system.

6. The soft value extraction method applicable to the OvXDM system according to claim 1, further comprising:
    performing synchronous processing and channel equalizing operations on a received signal sequence; and
    performing, according to a predetermined decoding method, a waveform decoding operation on the received signal sequence obtained after synchronous processing and channel equalizing, to generate the hard value sequence.

7. The soft value extraction method applicable to the OvXDM system according to claim 6, wherein the predetermined decoding method is a Viterbi decoding method.

8. A soft value extraction device applicable to an overlapped X domain multiplexing (OvXDM) system, comprising a hardware processor and a memory, wherein the hardware processor is configured to execute the following program units stored in the memory:
    a first predictive value calculation unit, configured to perform a waveform encoding operation on all symbols in a hard value sequence obtained by decoding, to generate a predictive value of the symbol obtained after overlapped coding;

a second predictive value calculation unit, configured to reverse the symbols in the hard value sequence one by one, and perform an overlapped coding operation on each reversed symbol and associated symbols before and after the symbol, to generate a predictive value of the reversed symbol; and a soft value calculation unit, configured to: for each symbol in the hard value sequence, calculate a soft value of the current symbol based on $A \times (z^{+1} - z^{-1})$, wherein A is a coefficient associated with a channel type, $z^{+1} = \|y_{rx} - y^{+1}\|^2$, and $z^{-1} = \|y_{rx} - y^{-1}\|^2$, wherein if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence.

9. The soft value extraction device applicable to the OvXDM system according to claim 8, wherein the hardware processor is configured to further execute the following program unit stored in the memory: a coefficient unit, configured to assign a value to the coefficient A in the soft value calculation unit, wherein when a channel is an additive white Gaussian noise channel, $$-\frac{1}{2\sigma^2}$$

is assigned to A if the symbol obtained after waveform decoding is +1; or $$\frac{1}{2\sigma^2}$$

is assigned to A if the symbol obtained after waveform decoding is −1, wherein $\sigma^2$ is a mean square deviation of the channel.

10. The soft value extraction device applicable to the OvXDM system according to claim 9, wherein the hardware processor is configured to further execute the following program unit stored in the memory: an adjustment factor unit, configured to further introduce an adjustment factor φ when the soft value calculation unit calculates the soft value of the current symbol, such that the soft value of the current symbol is $\varphi \times A \times (z^{+1} - z^{-1})$, wherein the adjustment factor φ ranges from 0 to 1, and φ decreases as a total number of times of overlapping in the OvXDM system increases.

11. The soft value extraction device applicable to the OvXDM system according to claim 8, wherein the hardware processor is configured to further execute the following program unit stored in the memory: a channel attenuation unit, configured to perform a channel attenuation operation when the soft value calculation unit calculates the soft value of the current symbol, wherein a channel attenuation coefficient is α, such that $z^{+1} = \|y_{rx} - \alpha y^{+1}\|^2$, and $z^{-1} = \|y_{rx} - \alpha y^{-1}\|^2$.

12. The soft value extraction device applicable to the OvXDM system according to claim 8, wherein the hardware processor is configured to further execute the following program unit stored in the memory:

a preprocessing unit, configured to perform synchronous processing and channel equalizing operations on a received signal sequence; and a decoding unit, configured to perform, according to a predetermined decoding method, a waveform decoding operation on the received signal sequence obtained after synchronous processing and channel equalizing, to generate the hard value sequence.

13. The soft value extraction device applicable to the OvXDM system according to claim 12, wherein the predetermined decoding method is a Viterbi decoding method.

14. The soft value extraction device applicable to the OvXDM system according to claim 8, wherein the OvXDM system is an overlapped time division multiplexing (OvTDM) system, an overlapped frequency division multiplexing (OvFDM) system, an overlapped code division multiplexing (OvCDM) system, an overlapped space division multiplexing (OvSDM) system, or an overlapped hybrid division multiplexing (OvHDM) system.

15. An overlapped X domain multiplexing (OvXDM) system, comprising a soft value extraction device, wherein the soft value extraction device comprises a hardware processor and a memory, wherein the hardware processor is configured to execute the following program units stored in the memory:

a first predictive value calculation unit, configured to perform a waveform encoding operation on all symbols in a hard value sequence obtained by decoding, to generate a predictive value of the symbol obtained after overlapped coding;

a second predictive value calculation unit, configured to reverse the symbols in the hard value sequence one by one, and perform an overlapped coding operation on each reversed symbol and associated symbols before and after the symbol, to generate a predictive value of the reversed symbol; and a soft value calculation unit, configured to: for each symbol in the hard value sequence, calculate a soft value of the current symbol based on $A \times (z^{+1} - z^{-1})$, wherein A is a coefficient associated with a channel type, $z^{+1} = \|y_{rx} - y^{+1}\|^2$, and $z^{-1} = \|y_{rx} - y^{-1}\|^2$, wherein if $y^{+1}$ is a predictive value of the symbol obtained after overlapped coding and before reversing, $y^{-1}$ is a predictive value of the symbol obtained after overlapped coding and reversing; or if $y^{-1}$ is a predictive value of the symbol obtained after overlapped coding and before reversing, $y^{+1}$ is a predictive value of the symbol obtained after overlapped coding and reversing; and $y_{rx}$ is a received signal sequence;

wherein the OvXDM system is an overlapped time division multiplexing (OvTDM) system, an overlapped frequency division multiplexing (OvFDM) system, an overlapped code division multiplexing (OvCDM) system, an overlapped space division multiplexing (OvSDM) system, or an overlapped hybrid division multiplexing (OvHDM) system.

16. The OvXDM system according to claim 15, wherein the hardware processor is configured to further execute the following program unit stored in the memory: a coefficient unit, configured to assign a value to the coefficient A in the soft value calculation unit, wherein when a channel is an additive white Gaussian noise channel, $$-\frac{1}{2\sigma^2}$$

is assigned to A if the symbol obtained after waveform decoding is +1; or $$\frac{1}{2\sigma^2}$$

is assigned to A if the symbol obtained after waveform decoding is −1, wherein $\sigma^2$ is a mean square deviation of the channel.

17. The OvXDM system according to claim 16, wherein the hardware processor is configured to further execute the following program unit stored in the memory: an adjustment factor unit, configured to further introduce an adjustment factor $\varphi$ when the soft value calculation unit calculates the soft value of the current symbol, such that the soft value of the current symbol is $\phi \times A \times (z^{+1} - z^{-1})$, wherein the adjustment factor $\varphi$ ranges from 0 to 1, and $\varphi$ decreases as a total number of times of overlapping in the OvXDM system increases.

18. The OvXDM system according to claim 15, wherein the hardware processor is configured to further execute the following program unit stored in the memory: a channel attenuation unit, configured to perform a channel attenuation operation when the soft value calculation unit calculates the soft value of the current symbol, wherein a channel attenuation coefficient is $\alpha$, such that $z^{+1} = \|y_{rx} - \alpha y^{+1}\|^2$, and $z^{-1} = \|y_{rx} - \alpha y^{-1}\|^2$.

19. The OvXDM system according to claim 15, wherein the hardware processor is configured to further execute the following program unit stored in the memory: further comprising:
 a preprocessing unit, configured to perform synchronous processing and channel equalizing operations on a received signal sequence; and
 a decoding unit, configured to perform, according to a predetermined decoding method, a waveform decoding operation on the received signal sequence obtained after synchronous processing and channel equalizing, to generate the hard value sequence.

20. The OvXDM system according to claim 19, wherein the predetermined decoding method is a Viterbi decoding method.

* * * * *